(12) United States Patent
Tsuji et al.

(10) Patent No.: US 7,996,990 B2
(45) Date of Patent: Aug. 16, 2011

(54) HEAT EXCHANGER AND METHOD FOR MANUFACTURING THE SAME

(75) Inventors: Masanori Tsuji, Nagano (JP); Takahide Maezawa, Nagano (JP)

(73) Assignee: GAC Corporation, Nagano (JP)

( * ) Notice: Subject to any disclaimer, the term of this patent is extended or adjusted under 35 U.S.C. 154(b) by 301 days.

(21) Appl. No.: 12/348,177

(22) Filed: Jan. 2, 2009

(65) Prior Publication Data

US 2009/0113711 A1    May 7, 2009

Related U.S. Application Data

(62) Division of application No. 10/495,062, filed as application No. PCT/JP02/11642 on Nov. 8, 2002, now Pat. No. 7,500,515.

(30) Foreign Application Priority Data

Nov. 9, 2001 (JP) ................................. 2001-344455

(51) Int. Cl.
*B21D 39/08* (2006.01)

(52) U.S. Cl. ........... 29/890.044; 29/890.03; 29/890.043; 29/890.047; 165/173; 165/177; 165/183

(58) Field of Classification Search ............. 29/890.038, 29/890.039, 890.04, 890.042, 890.043, 890.044, 29/890.09, 727, 421.1, 890.03, 890.046, 29/890.047; 165/173, 178, 183

See application file for complete search history.

(56) References Cited

U.S. PATENT DOCUMENTS

| | | | | |
|---|---|---|---|---|
| 1,812,509 A * | 6/1931 | Benson | .......................... | 165/151 |
| 3,148,728 A * | 9/1964 | Grenell et al. | ................. | 165/148 |
| 3,286,328 A * | 11/1966 | Anderson | ................. | 29/890.038 |
| 3,546,763 A * | 12/1970 | Pasternak | .................... | 29/890.04 |
| 4,241,785 A * | 12/1980 | O'Connor et al. | ............ | 165/172 |
| 4,269,267 A | 5/1981 | Labrande | | |
| 5,067,235 A * | 11/1991 | Kato et al. | ............... | 29/890.043 |
| 5,299,636 A * | 4/1994 | Potier | ............................ | 165/173 |
| 7,500,515 B2 * | 3/2009 | Tsuji et al. | .................... | 165/173 |

FOREIGN PATENT DOCUMENTS

| | | |
|---|---|---|
| JP | 5450467 | 4/1979 |
| JP | 57195545 | 12/1982 |
| JP | 58164995 | 9/1983 |
| JP | 6219691 | 1/1987 |
| JP | 08247678 | 9/1996 |
| JP | 09141363 | 6/1997 |
| JP | 11320005 | 11/1999 |
| JP | 2000169926 | 6/2000 |

* cited by examiner

*Primary Examiner* — David P Bryant
*Assistant Examiner* — Ryan J Walters
(74) *Attorney, Agent, or Firm* — Blank Rome LLP (57) ABSTRACT

There is provided a method of manufacturing a heat exchanger, including a first step of mounting an end part of flat tube to a header, assembling the flat tube and fins, and sealing a part where the header and the end part is attached, and a second step of increasing an internal pressure of the flat tube to expand other part of flat tubes aside from the end parts with respect to the end part of the tube in order to make the fins and the other part of the flat tube in contact each other. According to this method of manufacturing, in the second step, the other part of the flat tube that passes through the fins is expanded, so that it is possible to mechanically join the flat tube and the fins, and a plate fin-type heat exchanger with high strength and heat exchange efficiency can be easily provided.

5 Claims, 13 Drawing Sheets

HEAT EXCHANGER AND METHOD FOR MANUFACTURING THE SAME

CROSS-REFERENCED TO RELATED APPLICATIONS

This application is a division of application Ser. No. 10/495,062, filed Sep. 14, 2004, now pending, which is the U.S. national phase of PCT/JP02/11642, filed Nov. 8, 2002. The disclosures of those applications are hereby incorporated by reference in their entireties into the present application.

TECHNICAL FIELD

The present invention relates to a heat exchanger that is used in a refrigeration apparatus and others, and a method of manufacturing the heat exchanger.

RELATED ART

Figure 15:
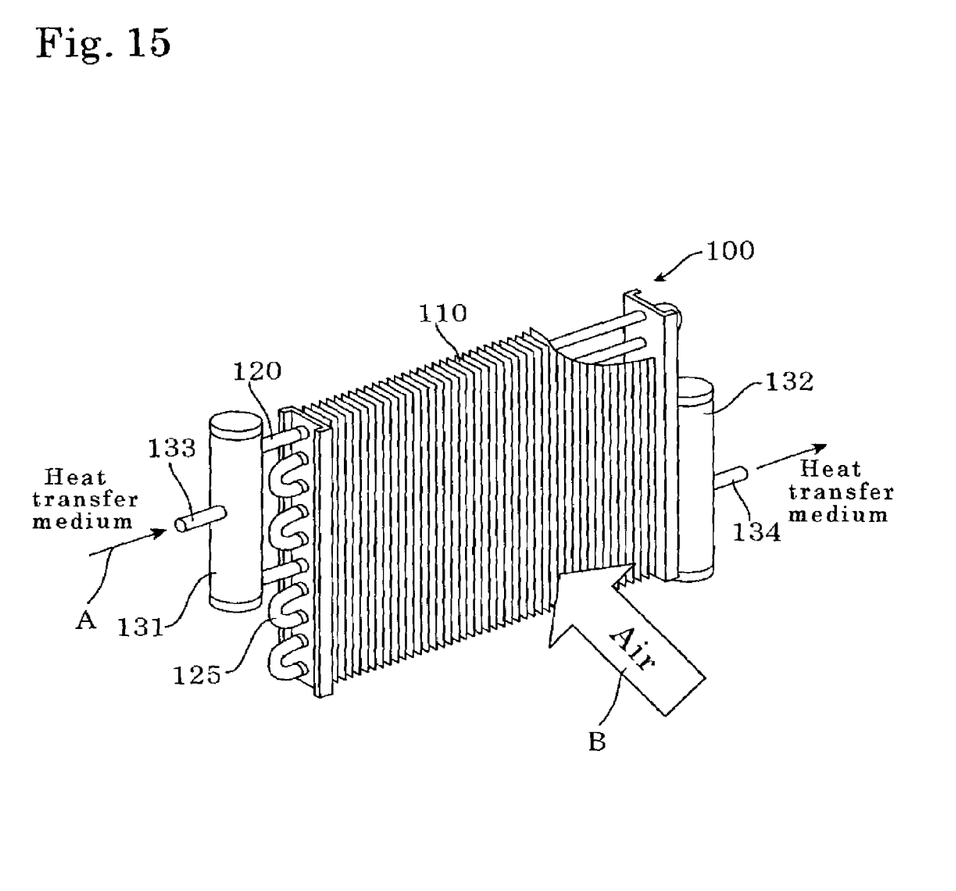
FIG. 15 shows a plate fin-type heat exchanger.

Heat exchangers used in refrigeration apparatuses, radiators, or the like, including plate fins having a plate-like form or corrugated fins having a wave-like form are known. A heat exchanger 100 shown in FIG. 15 is a plate fin-type heat exchanger including a plurality of plate fins 110 that are disposed in parallel with fixed intervals and a plurality of tubes 120 disposed so as to pass through the fins 110. By causing a heat exchanging fluid A, such as a refrigerant, to flow through the pipes or tubes 120, heat exchange is conducted between the fluid A and a fluid B, such as air, that flows outside the heat exchanger. In the manufacturing process of this plate fin-type heat exchanger 100, a rigid rod or a tube expander presses out and expands the individual tubes inserted in the fins 110 mechanically and the tubes 120 and the fins 110 are joined. Both ends of the tubes 120 are connected to headers 131 and 132, with a heat exchange medium supplied from an inlet 133 of the header 131 being guided via the individual tubes 120 to an outlet 134 of the header 132. It is possible to dispose a plurality of tubes 120 between the two headers. It is also possible to dispose, as shown in FIG. 15, U-shape tubes 120 so as to double back in a direction that crosses the fins 110 for increasing the contact area. In this kind of heat exchanger, straight tubes (straight cylindrical tubes) are used at the parts where the tubes are connecting the fins 110, and a tube expander passes through, then linking pipes 125 formed in U-shapes that are manufactured in advance are used to connect the straight tubes.

Figure 16:
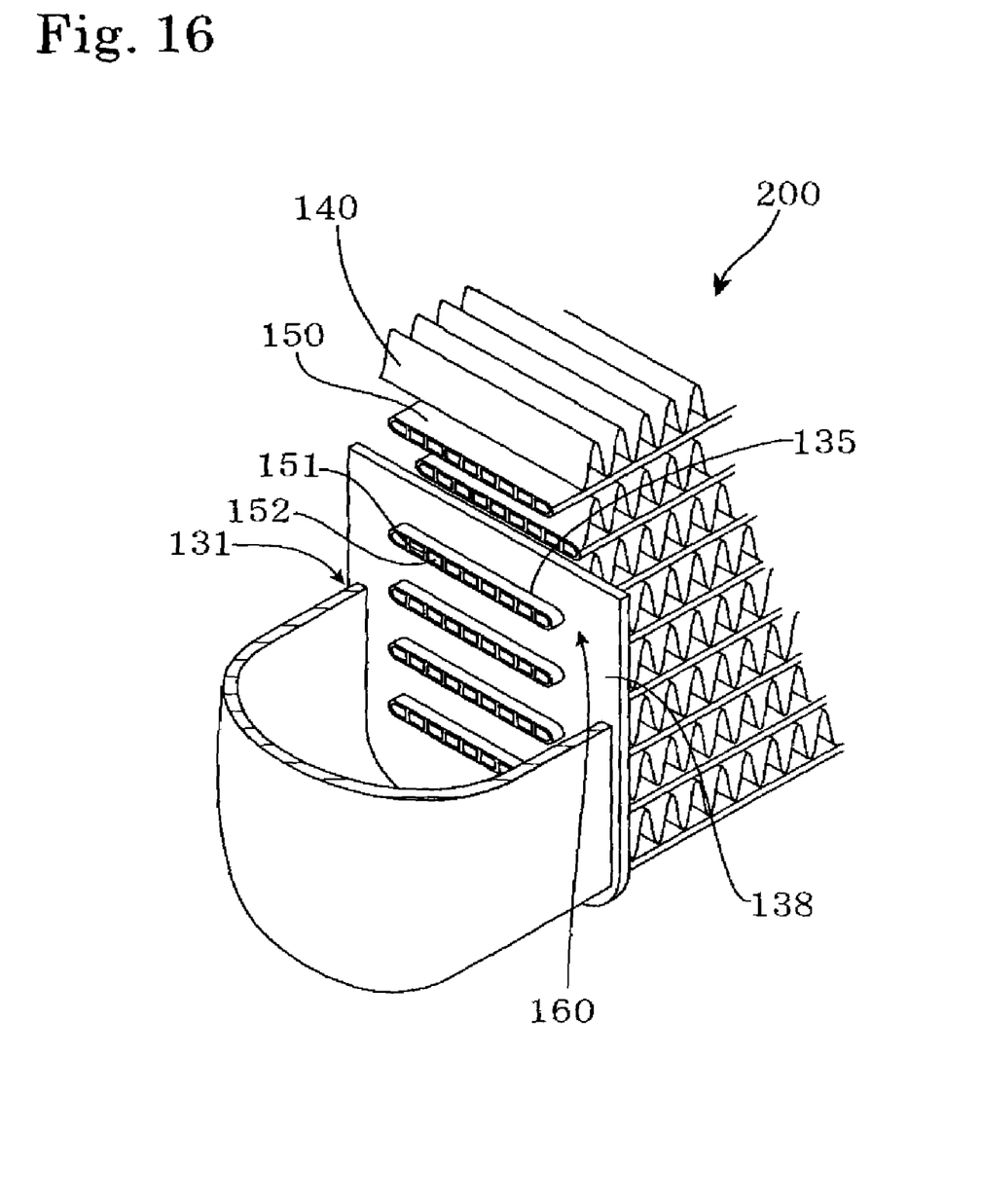
FIG. 16 shows a corrugated fin-type heat exchanger.

On the other hand, in a corrugated fin-type heat exchanger, as shown in FIG. 16, corrugated fins 140 that are machined in a wave-like form are used and the fins 140 are connected to tubes 150 by brazing or the like. In addition, in a heat exchanger 200 shown in FIG. 16, pipes or tubes that have a flat, not circular, cross-sectional form are used as the tubes 150 through which a heat exchange medium flows. The flat tubes 150 is multi-channel flat tubes that include a plurality of partitions 151 inside the flat tubes 150 for dividing insides into a plurality of parallel flow channels 152 for improving heat exchange efficiency.

A corrugated fin-type heat exchanger 200 can be manufactured by a method disclosed by Japanese Laid-Open Patent Publication No. S58-164995, for example. In that document, tubes 150 and corrugated fins 140 are stacked alternately and fixed to one another by brazing. Next, both end parts 160 of the tubes 150 are disposed so as to pass through joining holes 135 provided in side walls 138 of headers 131, and the end parts 160 are then expanded using a pinch or the like to optimize the clearance between the tube end parts 160 and the joining holes 135. After this, the tubes 150 are joined to the headers 131 by brazing or the like.

Figure 17A:
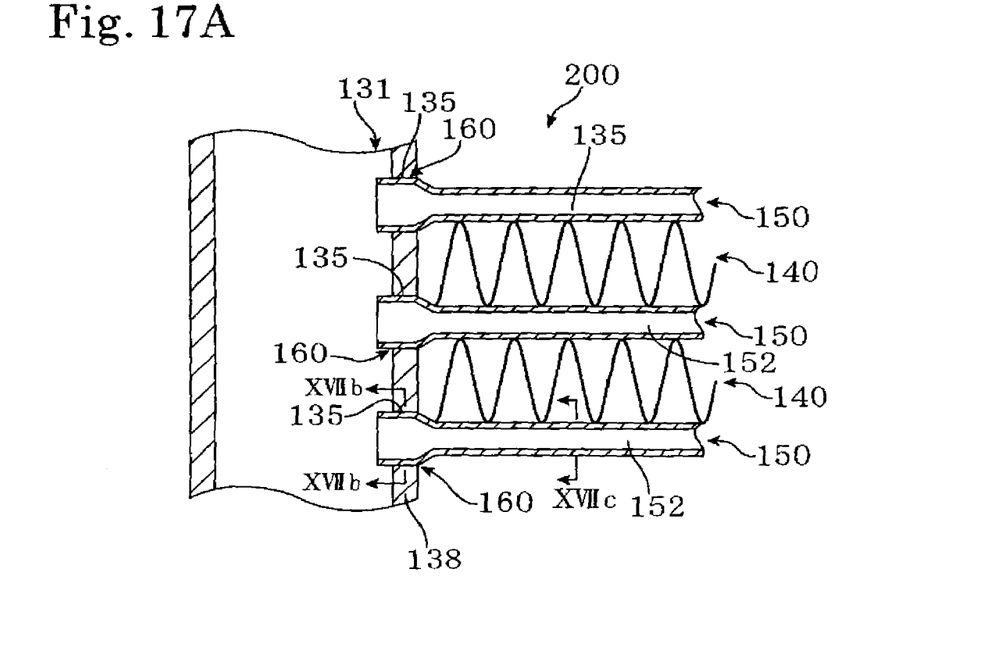
FIGS. 17A, 17B and 17C show the flat tubes in the corrugated fin-type heat exchanger shown in FIG. 16.
Figure 17B:
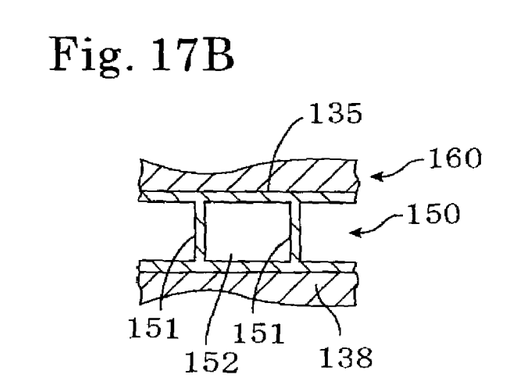
Figure 17C:
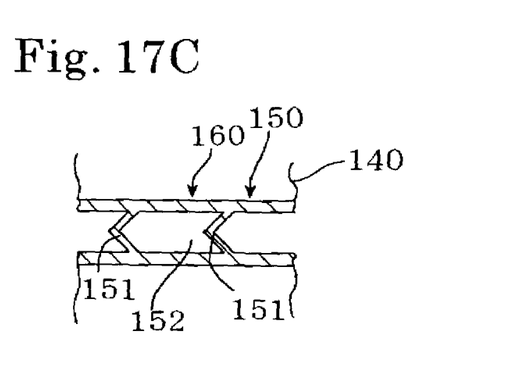

With this method of manufacturing, as shown in FIGS. 17A and 17B, the end parts 160 of the tubes 150 is expanded easily, so that a strong heat exchanger can be manufactured reliably. On the other hand, as shown in FIGS. 17A and 17C, other parts of the tubes 150 are left as unexpanded tubes and no method of expansion is described. In a corrugated-type heat exchanger, there is no need to expand the parts of the tubes aside from the parts joined to the headers, so that this in itself is not a problem.

When such corrugated fin-type and plate fin-type heat exchangers are compared, the fins 110 and the tubes 120 of the plate fin-type heat exchanger 100 are fixed by a mechanical joining method called "tube expansion", so that there is no need to use large-scale equipment, as represented by a heating furnace for brazing, or to expend a huge amount of energy for operating such equipment. Accordingly, it is possible to suppress manufacturing costs. Also, with the plate fin-type heat exchanger 100, by using flat multi-channeled tubes, it is possible to provide a low-cost heat exchanger with a heat exchanging performance on a par with or better than a corrugated fin-type heat exchanger.

When the plate fin-type heat exchanger 100 is assembled using flat multi-channeled tubes, it is necessary to expand the flat multi-channeled tubes along their entire length. Contrary, in the corrugated fin-type heat exchanger 200, it is sufficient to expand only the end parts 160 of the flat multi-channeled tubes 150 and there is no need to expand other parts since the fins is fixed on the tubes by brazing. With a plate fin-type heat exchanger, the fins are joined by tube expansion, so that it is necessary to insert a rigid rod into the numerous parallel flow channels formed by finely partitioning the flat tube so as to expand parts of the tube aside from the end parts. However, since the cross-sectional area of the parallel flow channels that are finely partitioned is extremely small, it is extremely difficult to insert a rigid rod along such flow channels. In addition, since the cross-sectional area of the parallel flow channels is extremely small, a rod that is rigid cannot be inserted, and it is difficult to prepare a tube expander with sufficient strength to expand the tubes.

Instead of tube expansion, it is possible to manufacture a plate fin-type heat exchanger that uses multi-channeled flat tubes by providing holes that are smaller than the multi-channeled flat tubes on the sides of the plate fins and cuts are connected to these holes and forcibly inserting the flat multi-channeled tubes into these holes. Another possible method of manufacturing uses flat multi-channeled tubes whose cross-sections are taper and fins with tapered slits. The flat tubes can be attached to the fins by inserting and sliding the flat multi-channeled tubes into the slits towards the narrow ends thereof. However, with these methods of manufacturing, after attachment, there is always the possibility of the fins and the flat tubes becoming detached, so that there is the burden and cost of having to join the attached parts by brazing, welding, or the like.

It is an object of the present invention to provide a new method of manufacturing that can expand parts of multi-channel flat tubes that contact fins after the flat tubes have been inserted into the fins. It is also an object of the present invention to provide a plate fin-type heat exchanger including flat multi-channeled tubes at low cost using this new method of manufacturing.

DISCLOSURE OF THE INVENTION

In the present invention, after flat tubes and fins are assembled, pressure inside the flat tubes is increased using fluid, and by expanding of the flat tubes due to increasing of internal pressure, the flat tubes and the fins are joined. A method of manufacturing a heat exchanger according to the present invention includes a first step of assembling a flat tube and fins and a second step of increasing an internal pressure of the flat tube to expand an other part of the flat tube aside from an end part of the flat tube that is attached to a header with respect to the end part in order to make the fins and the other part of flat tube in contact with each other. According to this method of manufacturing, in the first step, flat tubes and fins are assembled so as to pass through the fins, so that a plate fin-type heat exchanger can be manufactured easily.

According to the method of manufacturing of the present invention, flat tube is expanded by increasing the internal pressure of the tube. Such tube expansion may be carried out by decreasing the external pressure, but in many cases, it is possible to expand flat tubes by introducing a fluid such as a gas or liquid into the flat tubes to increase the internal pressure. Accordingly, it is not necessary to use a jig, such as a tube expander. When multi-channel flat tubes whose inside is divided into a plurality of parallel flow channels by at least one partition are used, the problem of not being able to insert a sufficiently rigid expander due to the cross-sectional surface area being too small does not occur. According to the invention, tube expansion can be carried out dependably regardless of the shape and cross-sectional surface area so that tubes can be mechanically joined to the fins. Even in the case of a corrugated fin-type heat exchanger, this method of manufacturing is advantageous since a tube expansion process can be easily implemented afterwards to the joining in order to make the contact between the tubes and the fins more reliable.

For a plate fin-type heat exchanger, an effect of those multi-channel flat tubes can be expanded and joined to the fins in accordance with the invention is so large. Using multi-channel flat tubes that have high heat exchange efficiency, it is possible to provide, at low cost, a plate fin-type heat exchanger with a solid construction in which tubes and fins are joined by expansion. According to the present invention, it is possible to provide a heat exchanger with high heat exchange efficiency as well as high strength. In addition, not limited to the flat tube, since there is no need to insert a tube expander, there is increased flexibility for the arrangement of the tubes that are connected to the fins. For example, even if using no flat tubes, in the prior art, straight tubes for fin contact area and U-shaped connecting pipes for connecting the tubes are used in order to allow an expander to pass through the straight tubes. In this invention, integrated tubes that include straight parts and U-shaped parts can be used and it is possible to make the fins and tubes in contact with each other easily.

When an actual plate-fin type or corrugated fin-type heat exchanger is manufactured according to the method of the present invention, it is easiest to apply pressure by introducing a fluid into the flat tubes via a header or headers. In the first step, the end part of the flat tube is mounted to a header, the flat tube and the fins are assembled, and the part where the end part and a header are mounted is sealed. Then, fluid is introduced to increase the internal pressure of the flat tube. In this method, it is not necessary to expand the end part that is attached to the header and it is extremely easy to manufacture a heat exchanger using flat tubes. A heat exchanger manufactured according to this method comprises a flat tube that extends from a header and fins that contact the flat tube, with the other part of the flat tube aside from an end part attached to the header being expanded with respect to the end part. In a plate fin-type heat exchanger, it becomes possible to attach flat tubes by passing the flat tubes through the fins.

As described above, with the method of manufacturing of the present invention, tubes can be expanded without relation to the cross-sectional area inside the flat tubes. Accordingly, tubes can be expanded even if the cross-sectional area is so small, so that the method of manufacturing is suited to a heat exchanger that uses multi-channel flat tubes whose inside is divided into a plurality of parallel flow channels by at least one partition. To obtain a desired form when tubes have been expanded and to ensure the thickness of the partitions being within a predetermined range after the expansion, it is preferable for the partition or partitions that divide the inside of the tubes into a plurality of parallel flow channels to be at least partially deformed and placed in a contracted state. In the second step, when the internal pressure of the flat tubes is increased, the partitions are extended or restored to a desired shape by the pressure, so that a heat exchanger including multi-channel flat tubes of a desired shape can be manufactured. In the manufactured heat exchanger, the partitions at the end parts of the flat tubes remained contracted and only the partitions in the other parts become extended almost straight.

The partitions that are at least partially deformed and placed in a contracted state include partitions that are bent, curved, or inclined. With such partitions, it is possible to smoothly expand the tubes in the minor or sub axis direction of a cross-section thereof, so that the contact surface pressure between the fins and the flat tubes can easily be kept even. By achieving an even contact surface pressure around the entire circumference of the flat tubes, the effects of contact resistance at the contact surfaces between the fins and the flat tubes can be reduced, so that it is possible to provide a heat exchanger with superior heat exchange efficiency.

In the method of manufacturing of the present invention, the internal pressure of the tubes is increased for expansion, so that by setting the pressure at a pressure used for gas-tightness test or pressure test, the process for joining the tubes and fins and the process for the above test can be carried out simultaneously.

In a heat exchanger in which a plurality of flat tubes are attached in a state where the tubes pass through a plurality of plate-like fins in parallel, it is preferable that the flat tubes are attached with a major axis direction of cross-sections thereof in a direction perpendicular to a longitudinal direction of the fins and the tubes are expanded to contact the tubes and the fins each other. The resistance of the flow of external fluid in a direction perpendicular to the flat tubes area becomes little and contact surface area in that direction is increased. Accordingly, a heat exchanger with little pressure loss for external fluid and high heat exchange efficiency can be provided. In addition, by attaching the flat tubes so that a major axis direction of cross-sections of the tubes is inclined from a direction that is perpendicular to the longitudinal direction of the fins, it is possible to facilitate the downward flow of water droplets adhering to the surfaces of the fins and the flat tubes, so that there is favorable drainage. Accordingly, it is possible to avoid increases in pressure loss for the external fluid due to accumulation of water droplets or frost formation on upper surfaces of the flat tubes, so that it is possible to provide a heat exchanger with even higher heat exchange efficiency.

When multi-channel flat tubes and fins are joined by expansion of the tubes, the flat tubes are made larger than the size of burring holes or slits provided in advance in the fins, so that there is the possibility of the fins springing back after the tubes have been expanded, resulting in the desired contact surface pressure not being achieved for the fins and the flat tubes. The effects of such springing back can be avoided by making the partitions positioned at or near a center in a major axis direction of a cross-section of the tubes longer than other partitions. It is also possible to avoid such effects by making parts of openings in the fins for joining or attaching the flat tubes that are faced the center of the flat tubes narrower than other parts of the openings.

BEST MODE FOR CARRYING OUT THE INVENTION

Figure 1:
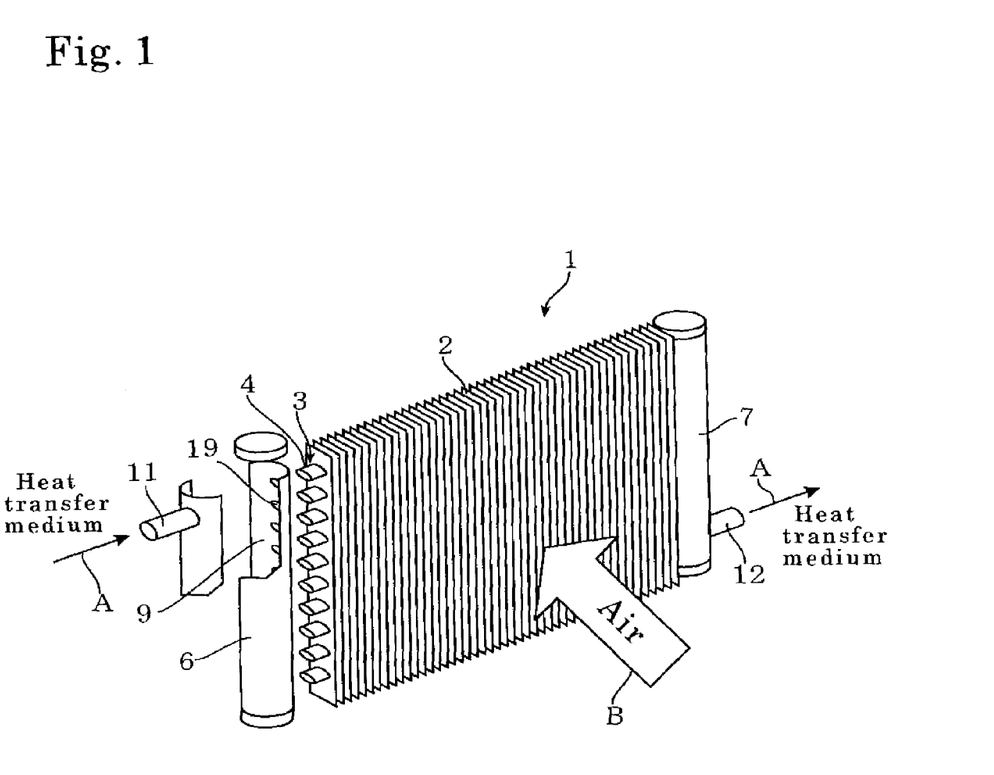
FIG. 1 shows a heat exchanger according to the present invention schematically.
Figure 2:
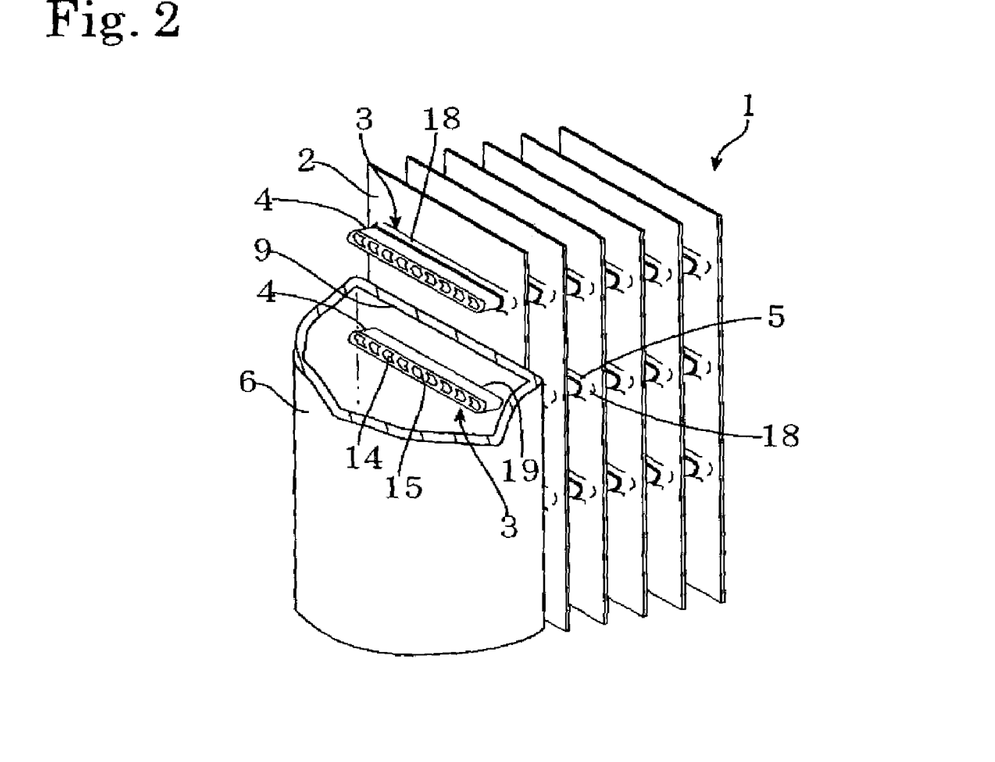
FIG. 2 shows a perspective view of principal parts of the heat exchanger shown in FIG. 1.

The present invention will now be described in more detail with reference to the drawings. FIG. 1 is a schematic diagram showing a heat exchanger according to the present invention. FIG. 2 is an expanded view of a state where a header, tubes (flat tubes in the present embodiment), and fins of the heat exchanger 1 have been assembled. The heat exchanger 1 of the present embodiment is a plate fin-type heat exchanger and has a plurality of plate-type fins 2 disposed in parallel with fixed gaps in between and a plurality of flat tubes 3 that are attached to the fins 2 in a state where the flat tubes 3 pass through the fins 2 in parallel. These flat tubes 3 are flat multi-channeled tubes (multi-channel flat tube) whose insides are divided into a plurality of parallel flow channels by a plurality of partitions. End parts 4 at both ends of the flat tubes 3 are connected to joining holes 19 formed in side walls 9 of headers 6 and 7 positioned on the left and the right so that a heat transfer medium (internal fluid) A introduced from an inlet 11 of the header 6 passes through the individual flat tubes 3 and is guided to an outlet 12 of the header 7. By doing so, when air B, which is an external fluid, passes the heat exchanger 1, the air contacts the fins 2 whose temperature has been influenced by the flat tubes 3 and so is cooled or heated.

Figure 3:
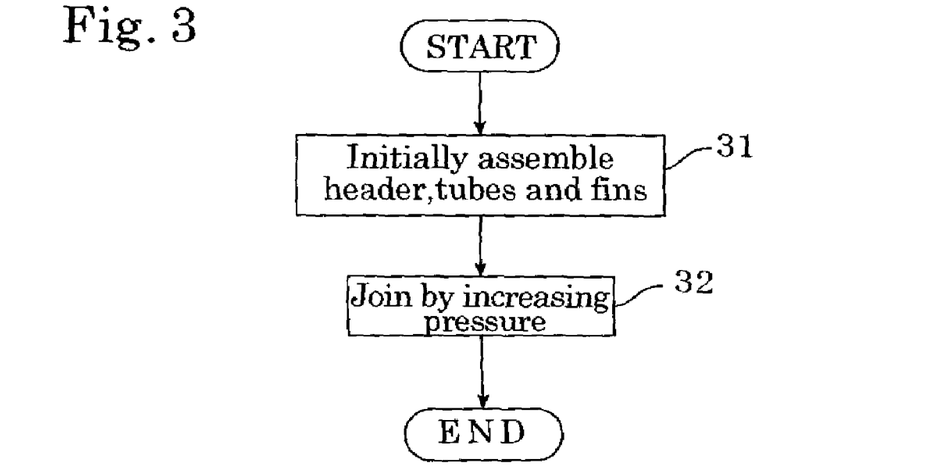
FIG. 3 shows a flowchart of a method of manufacturing a heat exchanger according to the present invention.
Figure 4:
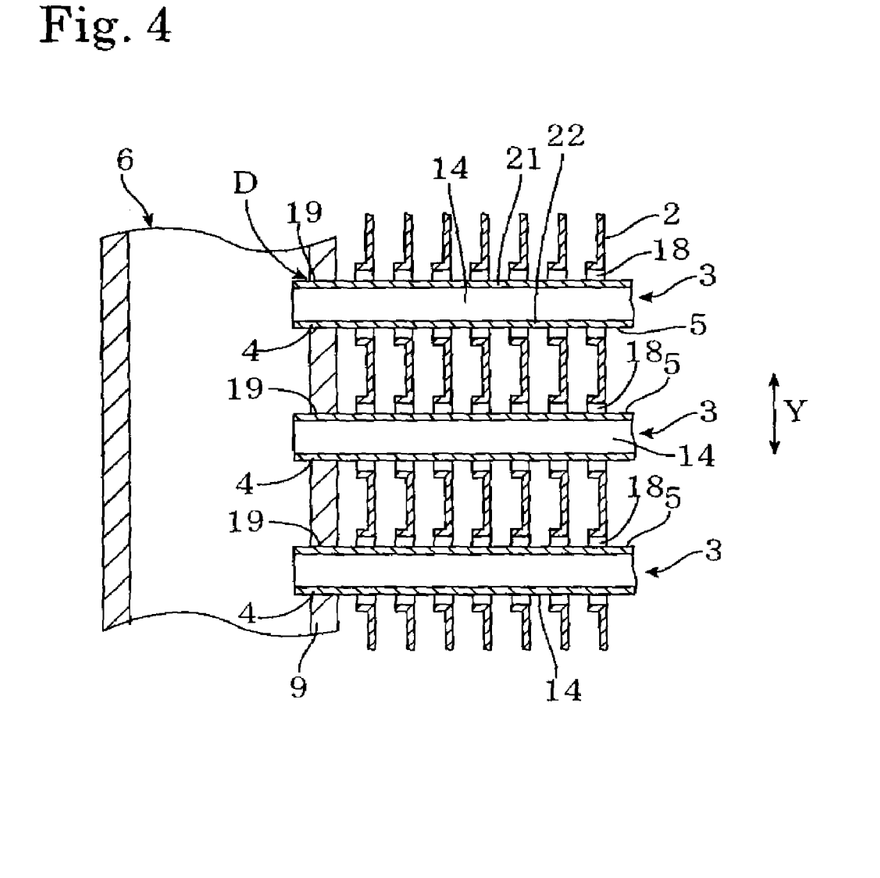
FIG. 4 shows an initial assembling of fins, flat tubes, and a header in a first step.
Figure 5:
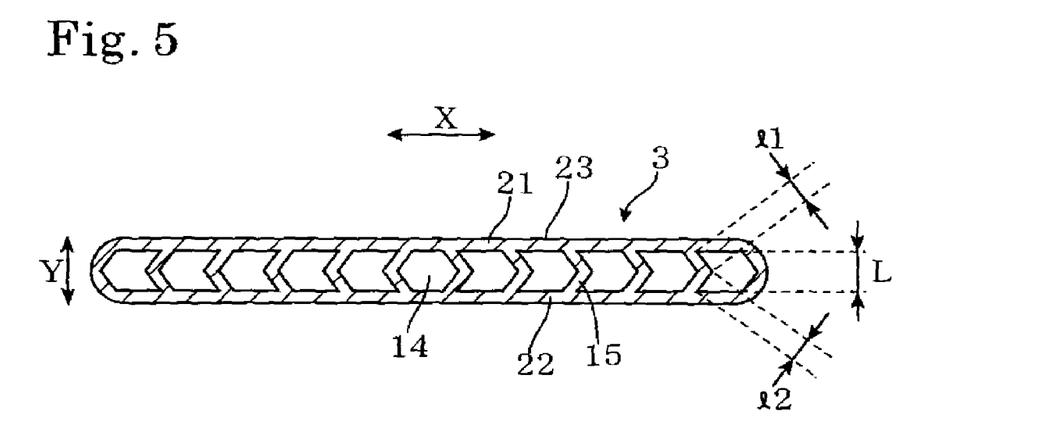
FIG. 5 shows a cross-sectional view of the flat tubes before expansion.

FIG. 3 is a flowchart schematically showing the flow of the method of manufacturing according to the present invention. The method of manufacturing according to the present invention can be roughly divided into two steps. A first step 31 is initial assembly and a second step 32 joins the fins and tubes by applying pressure. As shown in FIG. 4, in the first step 31, the flat tubes 3 are inserted into burring holes (openings) 18 provided in advance in the fins 2 to initially assemble the fins 2 and the flat tubes 3. As can be understood from the enlarged cross-section shown in FIG. 5, the flat tubes 3 are tubes with a flat cross-section and have tube side walls 21 and 22 that face one another above and below. The wall 21 composes the top or upper wall and the wall 22 composes a bottom or lower wall, and the wall 21 and 22 are approximately parallel. The flat tubes have partitions 15 that are formed inside the tubes 3 and extend in an up-down direction and are V-shaped in cross-section. These partitions 15 forming a plurality of parallel flow channels 14 inside the tubes 3. The individual partitions 15 are bent in a major axis direction X in a cross-section of the tubes 3, and a total of the respective lengths l1 and l2 of the bent parts, that is (l1+l2), is longer than an internal diameter L in a minor or sub axis direction Y in the cross-section of the tubes 3.

The ends 4 of the flat tubes 3 that have been assembled so as to pass through the plurality of fins 2 are inserted into joining holes 19 that are provided in the headers 6 and 7. This results in a state where both ends 4 of the flat tubes 3 have been mounted to the headers 6 and 7 and other parts 5 of the flat tubes 3 have been assembled so as to pass through the fins 2. In this state, the ends 4 of the flat tubes 3 are joined or attached to the headers 6 and 7 by brazing or another suitable method, and sealed (a seal D). By doing so, the headers 6 and 7 are connected by the parallel flow channels 14 of the flat tubes 3 and paths through which the heat exchange fluid A, i.e., the internal fluid, passes are formed.

Figure 6A:
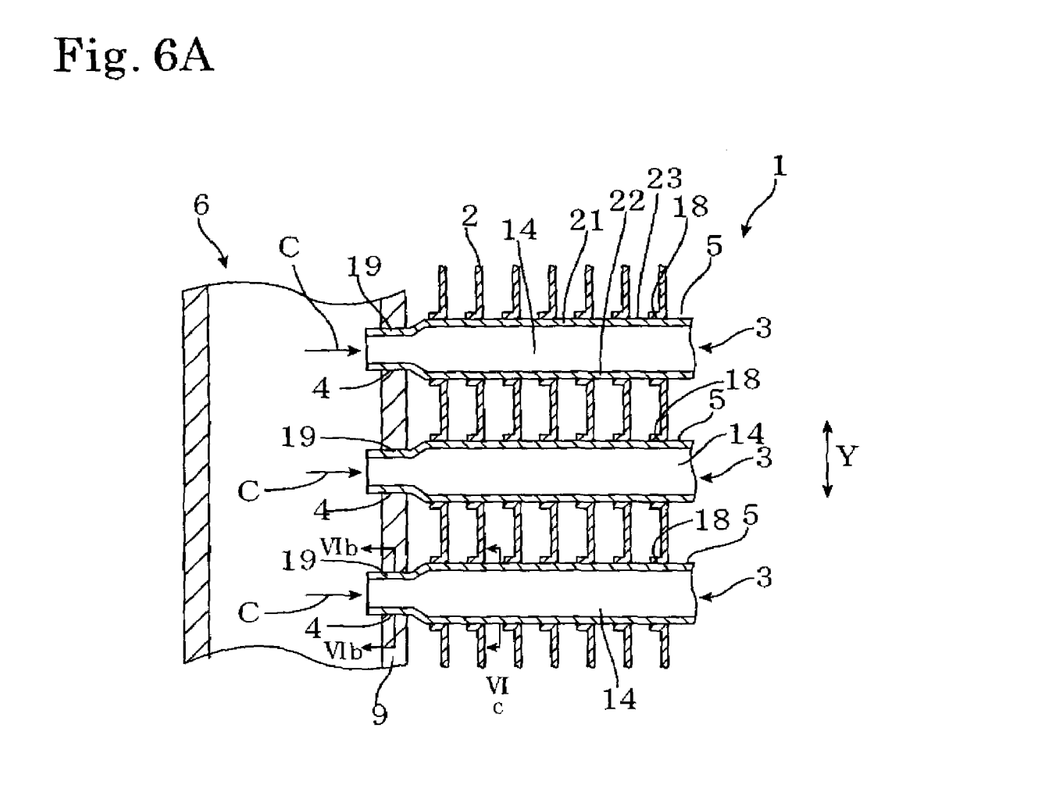
FIG. 6A shows a cross sectional view of an expanded state of the flat tubes in the second step.

Next, in the second step 32, a compressed fluid C is supplied via the headers 6 and 7 and tubes are expansion in diameter. The individual parallel flow channels 14 of the flat tubes 3 are filled with the gas or liquid C via the headers 6 and 7 and the internal pressure rises, resulting in the flat tubes 3 expanding and becoming joined to the fins 2 as shown in FIG. 6A. While all of the flat tubes 3 are connected to a single inlet header 6 and single outlet header 7 in this case, a plurality of inlet headers and/or outlet headers may be used. Headers, in this specification, includes ones that have a function for dividing up the flow of a heat exchange medium and the gas or liquid used for expansion into the individual flat tubes 3.

Figure 7A:
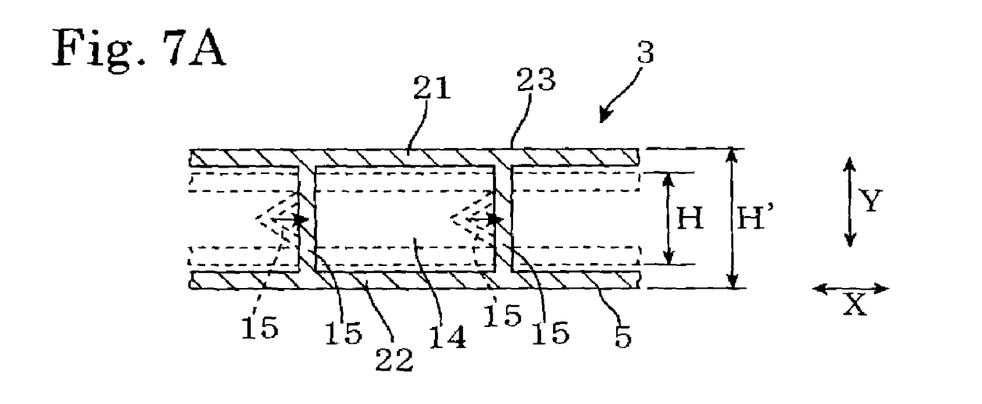
FIGS. 7A, 7B and 7C show process of the expansion of the flat tube.

As shown in FIG. 7A, when the internal pressure rises, easily shape-changeable parts of the flat tubes 3, that is, the partitions 15 that are partially deformed so as to be in a contracted state, are pulled to extend in a linear or almost linear state. As a result, the insides of the flat tubes 3 are expanded so that the flat tubes 3 reach burring holes 18 provided in the fins 2 and may become larger than the burring holes 18, so that outer circumferences 23 of the flat tubes 3 are joined to and contacted with the fins 2. In the present embodiment, the partitions 15 of the flat tubes 3 are formed in a contracted state with non-straight like a V-shaped cross-section. After the tubes are expanded, the external diameter H of the cross-section of the tubes 3 in the minor axis direction Y is extended to become H', and during the expansion, the partitions 15 do not greatly resist the expansion and the flat tubes 3 are expanded approximately evenly. In particular, there is no uneven expansion of the upper and lower walls 21 and 22 and tubes 3 are expanded with these walls 21 and 22 being kept as smooth curved or flat surfaces. Therefore, the flat tubes 3 can be joined to the fins 2 with an even contact pressure around the entire circumference of the tubes 3.

Figure 7B:
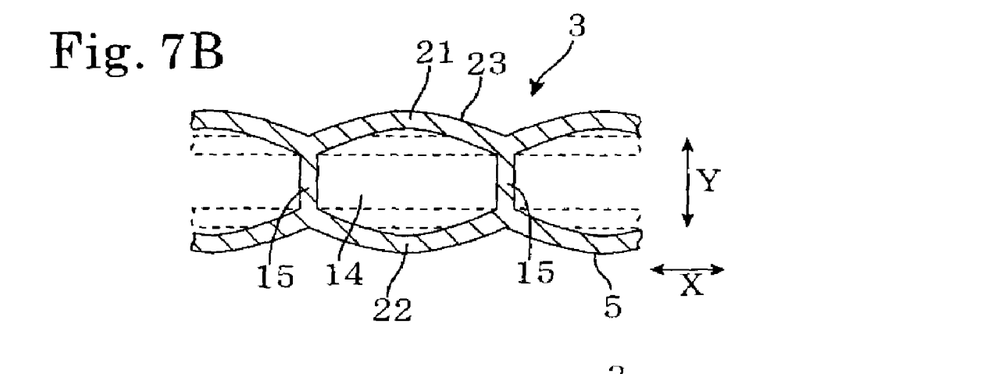
Figure 7C:
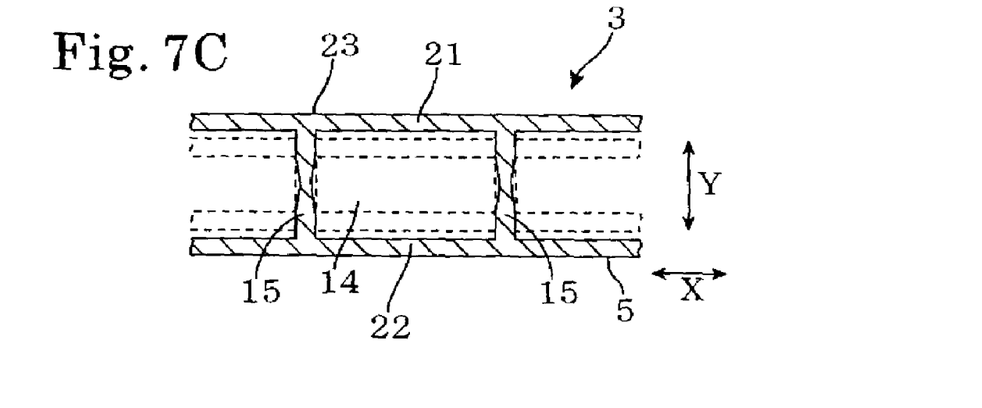

As shown in FIG. 7B, the method of manufacturing of the present invention can be applied to multi-channel flat tubes having partitions 15 extend completely straight, but since these partitions 15 do not extend in the minor axis direction Y, the partitions 15 cause resistance and the upper wall 21 and the lower wall 22 are unevenly expanded. In another case, when partitions 15 were insufficiently strong, as shown in FIG. 7C, the tube expansion may causes a localized decrease in the thickness of the partitions 15, resulting in the possibility of the partitions 15 breaking and reducing the heat exchange efficiency or in an increase in pressure drop. Contrary, if the partitions 15 are deformed in advance and given a curved, bent, or sloped cross-sectional form, it is possible to expand the flat tubes 3 into a desired shape with relatively low pressure and without generating stress, so that a heat exchanger in which the contact pressure between the fins 2 and the tubes 3 is even can be manufactured.

Figure 6B:
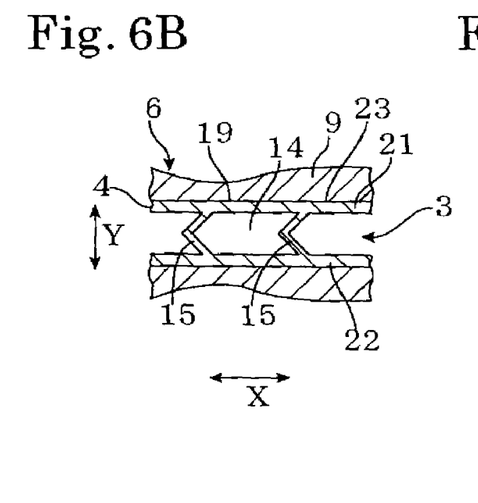
FIG. 6B shows an enlargement cross sectional view of end part of the flat tube, and FIG. 6C showing an enlargement cross sectional view of other part of the flat tube.
Figure 6C:
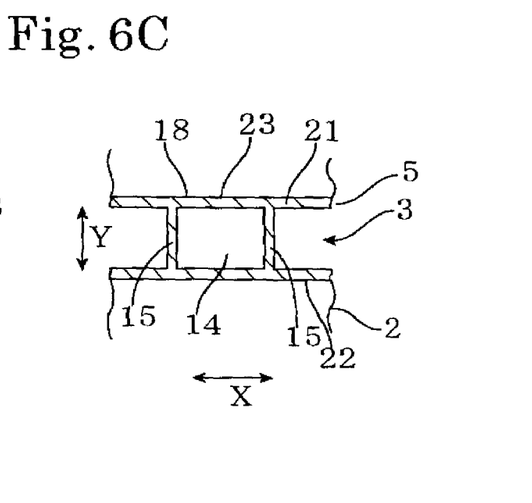

The end parts 4 that are connected to the joining holes 19 of the headers 6 and 7 have been fixed to the headers 6 and 7 in advance, so that there is little expansion even when the internal pressure rises. Accordingly, as shown in FIG. 6A, by the method of manufacturing according to the present invention, the heat exchanger 1 that includes the end parts 4 of the flat tubes 3 being attached to the headers 6 and 7 and other parts 5 of the flat tubes 3 being expanded with respect to the end parts 4 is supplied. In this heat exchanger 1, the partitions 15 remain bent at the end parts 4 of the flat tubes 3, as shown in FIG. 6B, but are extended so as to be approximately straight in other parts 5 of the tubes 3, as shown in FIG. 6C.

In the heat exchanger 1, the fins 2 and the flat tubes 3 are mechanically joined by the method of the invention which uses a pressure-applying tube expansion method where the internal pressure of the tubes 3 is increased using a gas or liquid for expansion. Accordingly, it is possible to fix, to the fins 2, multi-channel flat tubes 3 in which extremely small parallel flow channels 14 whose width (internal diameter) in the minor axis direction Y is below 1 mm. Such a small parallel flow channels 14 cannot be expanded with a pipe expander (or rigid rod). Since tubes are expanded reliably, when fixing the fins 2 and the flat tubes 3, it is not necessary to use a method such as brazing or welding. This means that the method of manufacturing according to the present invention can reliably and cheaply carry out mechanical joining in the form of tube expansion regardless of the magnitude of the internal diameter of tubes. In this case, it is possible to manufacture a plate-fin heat exchanger 1 with superior strength and high heat exchange efficiency using flat multi-channeled pipes 3 at a low manufacturing cost.

In addition, as the individual partitions 15 are bent and so are easily changed the shapes, the amount of pressure required to extend or change the partitions 15 can be made relatively small. It is possible to expand the flat tubes 3 by a pressure near the pressure for leakage and/or pressure resistance tests of the flat tubes 3 or a lower pressure. Accordingly, it is not necessary to make the flat tubes 3 thick so as to withstand beyond the test pressure, which means there are no accompanying increases in cost or weight. As one example, in a heat-exchanger using a flon refrigerant, a test pressure of the gas-tightness/pressure tests is 1 to 5 MPa, the partitions 15 can be stretched out and the flat tubes 3 can be joined to the fins 2 at around the level of such test pressure. This means that it is possible to carry out tube expansion of the tubes 3 and gas-tightness/pressure tests in the same manufacturing step, so that the manufacturing cost of a heat exchanger can be significantly reduced.

By making the partitions 15 of the flat tubes 3 that form the parallel flow channels 14 bent, the pipe side walls 21 and 22 of the flat tubes 3 can be made so as to extend evenly. This means that the fins 2 and the flat tubes 3 can be joined with an even contact pressure around the entire circumference of the contact surface. If the contact pressure is uneven in the case where the fins 2 and the flat tubes 3 are mechanically joined, contact resistance occurs and heat transfer between the flat tubes 3 and the fins 2 becomes poor, thereby reducing the heat exchange performance. With the heat exchanger 1 however, deterioration in heat transfer due to such unevenness in the contact pressure can be avoided and it is possible to provide a high-performance heat exchanger 1 with improved heat exchange performance and high durability due to its high mechanical strength.

Although there will fundamentally be a reduction in contact resistance if the surface pressure is increased by increasing the expansion rate, excessive expansion may cause buckling of the partitions 15 and breakage of the fins 2. It is preferable for the range of the expansion rate to be around 1 to 5% to prevent problems such as buckling of the partitions 15. Here, the tube expansion rate is expressed as $\{(H'/A)-1\} \times 100$ where the external diameter of the flat tubes 3 after the expansion is H' and the internal diameter of the burring holes 18 before the expansion is A. When tubes were expanded by inserting a pipe expander (or rigid rod) into the flat tubes 3, expansion rate can be controlled by the dimensions of the rigid rod, but when tubes are expanded by raising the internal pressure of the tubes 3, it becomes necessary to control the overall length of the partitions 15, or the magnitude of the internal pressure and the pressure application time. Of these, the internal pressure and pressure application time is greatly affected by tolerances in the dimensions of parts, tolerances in the compositions of materials, and environment during the manufacturing, so that when the heat exchanger 1 is mass produced, it is difficult to precisely control the internal pressure and/or application time. Accordingly, controlling the length of the partitions 15 is the best method for controlling the tube expansion rate.

If the internal diameter of the flat tubes 3 in the minor axis direction Y before the expansion is set as L, the internal diameter of the flat tubes 3 in the minor axis direction Y after the expansion is set as L', the thickness of the external side walls (the top wall 21 and the bottom wall 22) of the flat tubes 3 is set as t, and it is assumed that the expansion is carried out by changing shapes of the partitions 15 so that the partitions 15 are stretched out to become approximately straight, the overall length L' of the partitions 15 for limiting the expansion rate to a range of 1 to 5% is given by Equation (1) below. The clearance required for inserting the flat tubes 3 into the burring holes 18 is set at B.

$$L'=(1.01\sim1.05)\times\{(L+2t)+B\}-2t \qquad (1)$$

The partitions 15 that have the overall length L' calculated as shown above may be curved, bent, or inclined and set inside the flat tubes 3 having the internal diameter L. More specific values are given as follows. If the external diameter H in the minor axis direction Y of the flat tubes 3 before the expansion is set at 1 mm and the thickness of the side walls t is set at 0.2 mm, the internal diameter of the burring holes 18 is 1.2 mm. If the insertion clearance B is 0.2 mm and the expansion rate is set at 3.5%, the external diameter in the minor axis direction Y of the flat tubes 3 that is required after the expansion becomes 1.24 mm and the internal diameter in this case is 0.84 mm. Accordingly, the partitions whose overall length L' is 0.84 mm should be curved, bent, or inclined and inserted into the flat tubes 3 whose internal diameter is 0.6 mm.

Figure 8A:
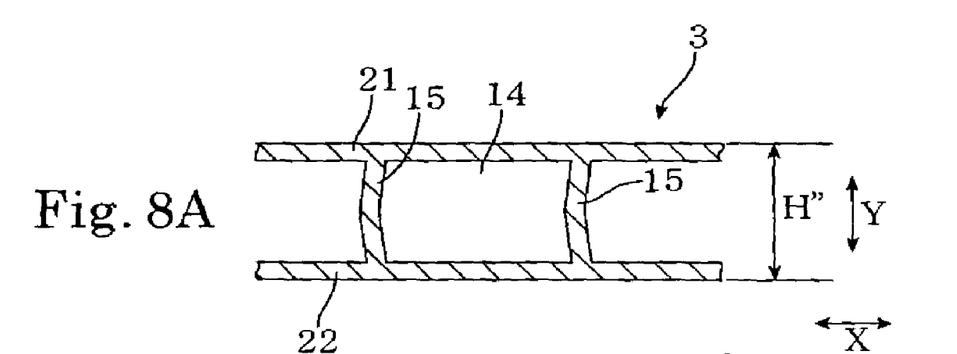
FIGS. 8A, 8B and 8C show process of manufacturing the flat tube.
Figure 8B:
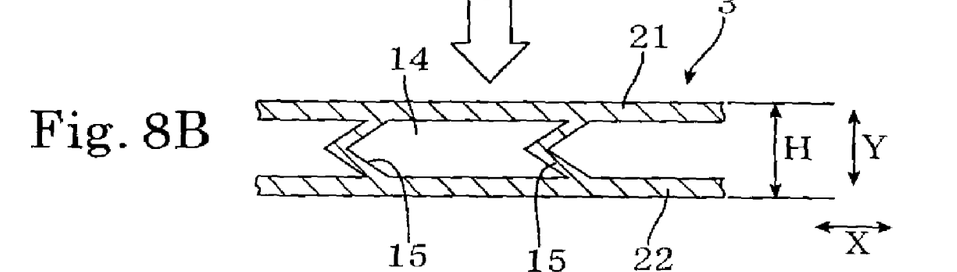
Figure 8C:
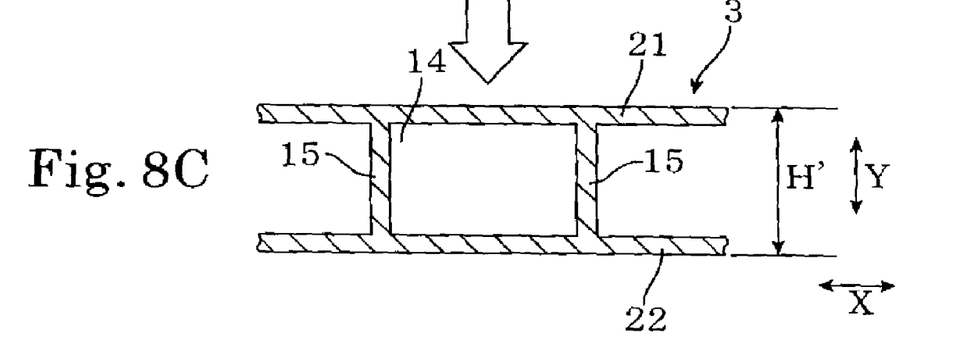

The expansion amount required for the flat tubes 3, that is, the external diameter H' in the minor axis direction Y of the flat tubes 3 after the expansion minus the external diameter H in the minor axis direction Y of the flat tubes 3 before the expansion is given as the total of the clearance for the burring holes 18 required when inserting the flat tubes 3 into the burring holes 18 and the required displacement required to achieve an appropriate surface pressure between the flat tubes 3 and the fins 2. As the external diameter H is made finer to further improve the heat exchange performance, the amount of expansion in the external diameter H, that is, the required proportion relative to the overall length of the partitions 15 increases. Accordingly, it becomes necessary to further bend the partitions 15 and place the partitions 15 inside smaller flat tubes 3, so that finer and more precise machining becomes necessary during extrusion molding. However, due to the rigidity of the dies and the conditions placed on the materials, etc., during molding, molding the desired shape is difficult. For this reason, as shown in FIG. 8A, flat tubes with an external diameter H" that simplifies machining during extrusion molding may be formed first, with as shown in FIG. 8B, the external diameter of the flat tubes then being reduced to the external diameter H by a resizing carried out by press molding or the like. In this case, to dependably form the partitions 15 in an easy-to-change state, the partitions 15 preferably be formed slightly bent during the extrusion molding. By doing so, as shown in FIG. 8C, it is possible to obtain flat tubes 3 that have the external diameter H' after the expansion.

Figures 9A, 9B:
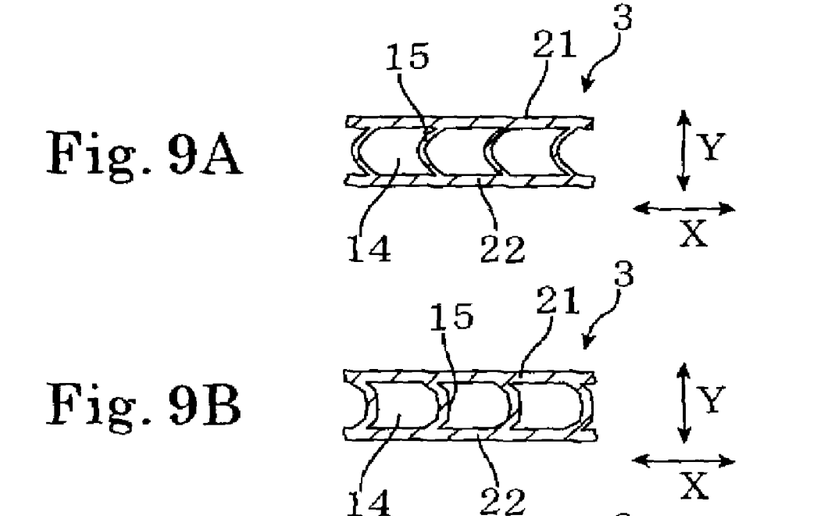
FIGS. 9A, 9B, 9C, 9D and 9E show modifications of the flat tubes.
Figure 9C:
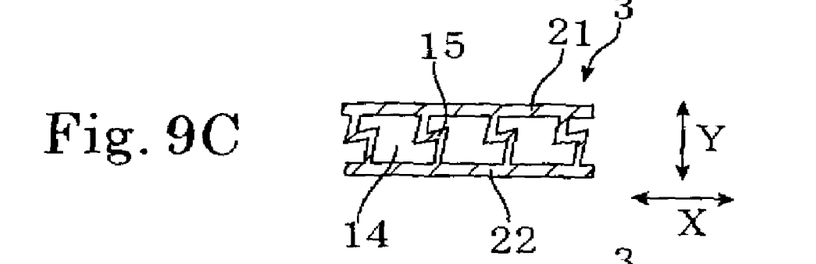
Figure 9D:
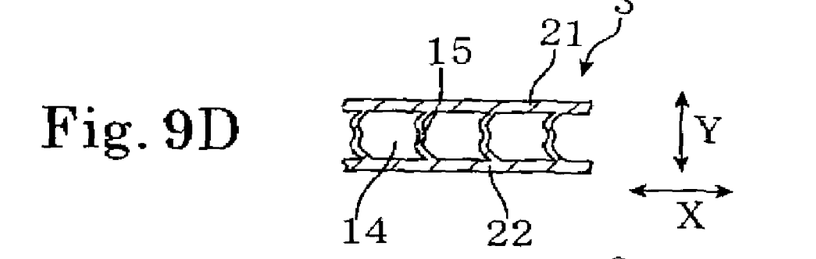
Figure 9E:
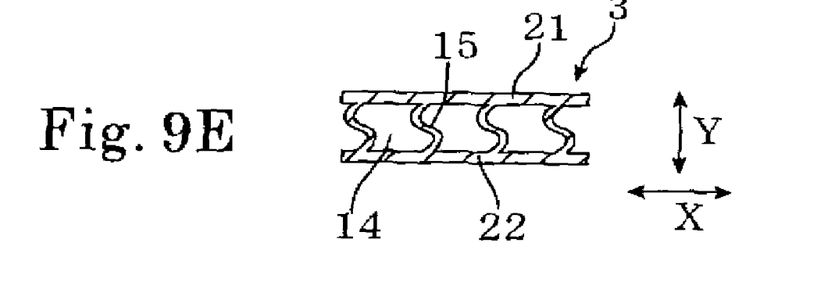

Although the partitions 15 of the flat tubes 3 described above are formed so as to be V-shaped in cross-section, the cross-sectional form of the partitions 15 is not limited to this. In FIGS. 9A to 9E, a number of variations of multi-channel flat tubes are shown. First, the partitions 15 shown in FIG. 9A are curved so that their cross-sectional form is approximately semi-circular. The partitions 15 shown in FIG. 9B have a cross-sectional form that is curved in the opposite direction to the partitions shown in FIG. 9A. The partitions 15 shown in FIG. 9C have a cross-sectional form that is bent in a Z shape. The partitions 15 shown in FIG. 9D have a cross-sectional form in the shape of a W that has been rotated by 90° to the right. The partitions 15 shown in FIG. 9E have a cross-sectional form in an S shape. In any of these flat tubes 3, the partitions 15 are curved or bent in the major axis direction X of the flat tubes 3 so that the partitions 15 are longer than the shorter diameter (the diameter in the minor axis direction Y) of the flat tubes 3.

Figure 10A:
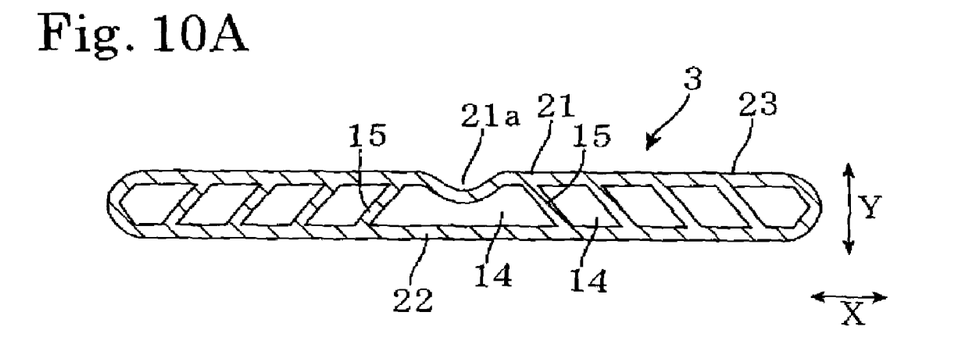
FIGS. 10A and 10B show flat tube with inclined partitions.
Figure 10B:
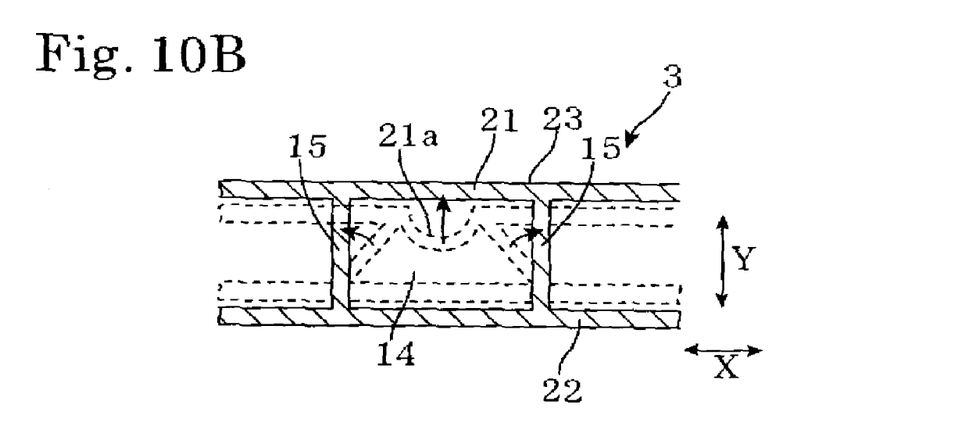

The partitions 15 are not limited to being curved or bent, and partitions 15 with an inclined cross-sectional form can be formed with an overall length that is longer than the shorter internal diameter of the flat tubes 3. An example of this is shown in FIG. 10. As shown in FIG. 10A, in the flat tubes 3, the partitions 15 disposed from the center to the right side are inclined from top-left to bottom-right, while the partitions 15 disposed from the center to the left side are inclined from top-right to bottom-left. In this cross-sectional form, a center part 21a of the top wall 21 is slightly curved. As shown in FIG. 10B, when the expansion is carried out by raising the internal pressure of the flat tubes 3, the individual partitions 15 stand up approximately perpendicular to the bottom wall 22, the curved part 21a of the top wall 21 becomes raised so that an outer circumference 23 of the top wall 21 becomes approximately horizontal, and the flat tubes 3 can be joined to the fins 2 with an even contact pressure. In this way, when the partitions 15 are inclined, the flat tubes 3 may be constructed so that a difference in the length of the top wall 21 and/or the bottom wall 22 before and after the expansion can be absorbed.

Figure 11:
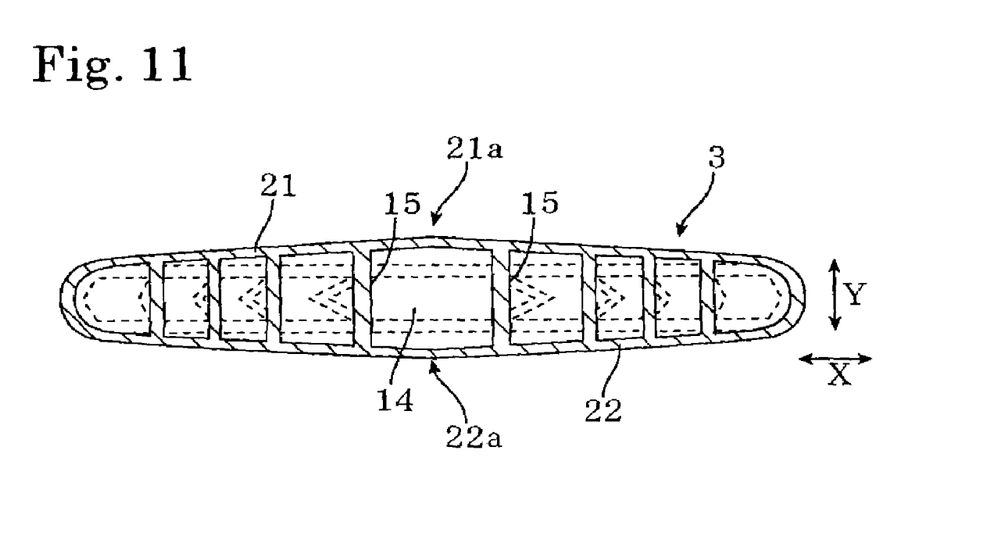
FIG. 11 shows a flat tube that can avoid the effects of fins springing back.

Fundamentally, the flat tubes 3 should be made flatter in order to maintain an even contact pressure between the fins 2 and the flat tubes 3 and to increase the performance of the heat exchanger 1. However, when the fins 2 and the flat tubes 3 are joined by the expansion, springing back of the fins 2 may affect. Due to such springing back, there is a possibility of the desired contact pressure not being achieved for the flat tubes 3 in the minor axis direction Y close to the center in the major axis direction X in the cross-sectional form. It is therefore preferable to increase the expansion rate around the center part. As shown in FIG. 11, the partitions 15 in central part of the flat tubes 3 may be made longer than other partitions 15, for example. By doing so, when the flat tubes 3 are expanded, the amount of the expansion of the center part 21a of the top wall 21 and a center part 22a of the bottom wall 22 that are greatly affected by the springing back can be increased.

Figure 12:
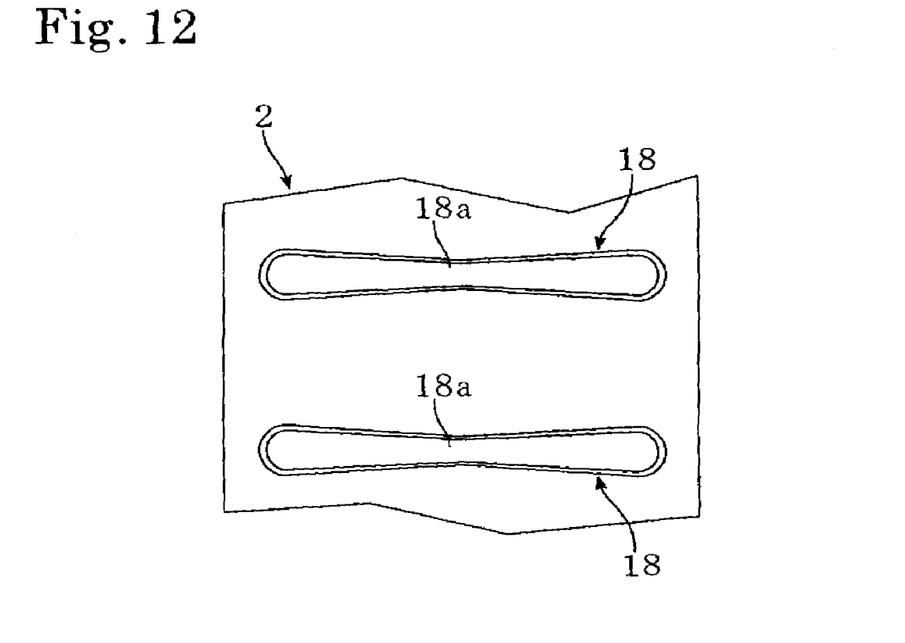
FIG. 12 shows burring holes that can avoid the effects of fins springing back.

Instead of changing the lengths of the partitions 15, it is also possible to avoid the effects of springing back by changing the shape of the burring holes 18 in the fins 2. In this case, as shown in FIG. 12, the burring holes 18 may be formed in the fins 2 so that parts 18a that are faced the center of the flat tubes 3 are narrower than other parts of the burring holes 18.

Figure 13:
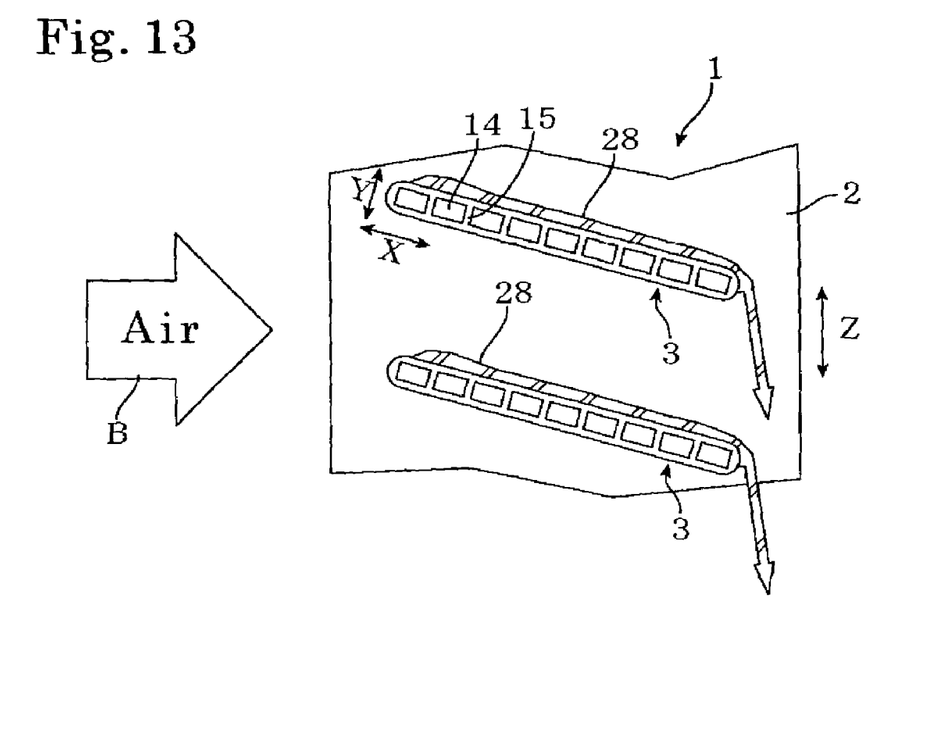
FIG. 13 shows a heat exchanger with improved water drainage.

In the heat exchanger 1, in view of pressure loss with respect to the external gas B, such as air, it is preferable for the major axis direction X of the flat tubes 3 to be aligned with the direction in which the external gas B flows. When the flat tubes 3 are disposed in this state, in many cases the major axis direction X will be aligned in the horizontal direction, so that water adhering to the flat tubes 3 does not run off and thereby reduces the heat transfer efficiency. For this reason, as shown in FIG. 13, the flat tubes 3 should preferably be attached to the fins 2 with a posture whereby the major axis direction X of a cross-section of the flat tube 3 is inclined to a direction that is perpendicular to a longitudinal axis direction Z of the fins 2. By doing so, water droplets, water, or condensation 28 that adhere to the outside of the flat tubes 3 run downwards via the fins 2 that extend vertically, so that there is superior drainage and reductions in the heat transfer efficiency can be avoided.

Figure 14:
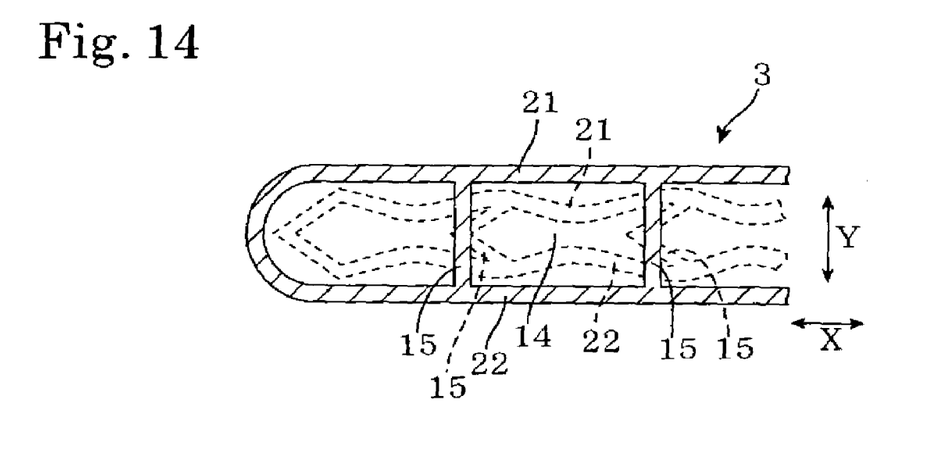
FIG. 14 shows a flat tube that can be expanded in a major axis direction.

It should be noted that although an example where the flat tubes 3 are expanded in the minor axis direction Y has been described, it is possible to expand the tubes in the major axis direction X as well as in the minor axis direction Y. In this case, the top wall 21 and the bottom wall 22 may be curved or bent in view of the required dimensions after the expansion. The flat tubes 3 shown by the broken lines in FIG. 14 are one example of such tubes. As shown by the solid lines in FIG. 14, the top wall 21 and the bottom wall 22 of these flat tubes 3 after the expansion are also flat or horizontal, so that the contact pressure with the fins 2 can be made even.

Also, since the flat tubes 3 are expanded and joined to the fins 2, it is not necessary to weld or braze the flat tubes 3 and the fins 2, but in some cases welding or the like may be carried out depending on how the heat exchanger 1 is used. That is, since the fins 2 and the flat tubes 3 are mechanically joined by the expansion, contact resistance between the fins 2 and the flat tubes 3 may be, in some case, higher compared to the case where the fins 2 and the flat tubes 3 are welded, a maximum drop of around 10% in heat exchange performance is expected. In applications where heat transfer performance is given priority, the fins 2 and the flat tubes 3 need to be joined by welding or the like. In the present invention, an even amount of expansion around the entire circumference of the flat tubes 3 is achieved by increasing the internal pressure of the tubes 3, so that it is easy to produce a state where the tubes 3 and the fins 2 are tightly attached. Such tightly attached state of the fins 2 and the tubes 3 is suit to brazing, welding, application of adhesive, or the like, and that the present invention is also effective in such cases.

Also, in the present invention, the openings formed in the fins 2 for attaching the flat tubes 3 may be slits. Although a heat exchanger having plate-type fins 2 has been described above, the shape of the fins is not limited to plates. The present invention is also not limited to multi-channel tubes and can be applied to any type of flat tubes. In addition, although a heat exchanger in which headers are connected to one another via straight flat tubes is described in the example given above, it is possible to manufacture a plate fin-type heat exchanger that uses flat tubes in a winding shape in which straight parts are connected by U-shaped connecting parts. The gist of the present invention is that there is no need to insert a tube expander, so that the arrangement of tubes (which are not limited to flat tubes) through which the heat exchange medium flows becomes flexible, which makes it possible to provide plate fin-type heat exchangers of a variety of constructions at low cost.

INDUSTRIAL APPLICABILITY

The present invention uses a pressure-applying tube expansion method in which the internal pressure of flat tubes is increased after other parts of the flat tubes pass through fins, and thus expand other parts of the tubes, thereby improving the contact between the fins and flat tubes. Accordingly, even when multi-channel flat tubes with a plurality of parallel flow channels in the form of minute sections are used as the tubes, it is possible to reliably carry out the expansion for other parts of the tubes aside from the end parts, so that the flat tubes and plate-like fins can be mechanically joined. Therefore, it is possible to manufacture a plate fin-type heat exchanger that uses multi-channel flat tubes at a low manufacturing cost and it is possible to provide a heat exchanger with superior heat exchange performance at a low cost.

The invention claimed is:

1. A method of manufacturing a heat exchanger comprising:
   assembling a first header, a flat tube, fins and a second header by inserting a first end part of the flat tube into the first header, said flat tube extending through said fins, and inserting a second end part of the flat tube into the second header; and
   pressurizing the flat tube by filling the flat tube with a fluid supplied to the flat tube via the first header and the second header so that the flat tube expands against the fins;
   wherein the flat tube is a multi-channel flat tube including at least one partition for dividing the inside of the flat tube into a plurality of parallel flow channels, and
   wherein said pressurizing comprises pressurizing the flat tube so that in the end part, the partition is in a contracted state where at least part of the partition is deformed, and in other parts, the at least one partition extends almost straight.

2. The method according to claim 1,
   wherein said pressurizing includes increasing the pressure in the flat tube to a test pressure used in a gas-tight test or a pressure test, or a pressure higher than the test pressure.

3. The method according to claim 1,
   wherein said assembling includes assembling a plurality of flat tubes and a plurality of plate-like fins so that the plurality of flat tubes pass through the plurality of plate-like fins in parallel.

4. The method according to claim 1,
   wherein said assembling includes assembling a plurality of flat tubes and fins so that a major axis direction of cross-sections of the plurality of flat tubes is perpendicular to a longitudinal direction of the fins.

5. The method according to claim 1,
   wherein assembling includes assembling a plurality of flat tubes and fins so that a major axis direction of cross-sections of the plurality of flat tubes is inclined to a direction that is perpendicular to a longitudinal direction of the fins.

\* \* \* \* \*